United States Patent Office 2,739,945
Patented Mar. 27, 1956

2,739,945

PRECIPITATED HYDROFORMING CATALYSTS

John P. Thorn, Elizabeth, Walter R. F. Guyer, Roselle, Erving Arundale, Westfield, N. J., assignors to Esso Research and Engineering Company, a corporation of Delaware No Drawing. Application June 21, 1952,
Serial No. 294,911

10 Claims. (Cl. 252—466)

This invention relates to the preparation of catalysts for the treatment and conversion of hydrocarbons. More specifically, it relates to a new and improved method of preparation of a catalyst containing small amounts of a noble metal catalyst on an alumina-containing catalyst support.

Noble metal catalysts, including platinum, palladium, rhodium, iridium, and the like, are known to be useful for the treatment and conversion of hydrocarbons in a variety of processes involving the splitting of carbon-carbon bonds and the transfer of hydrogen. These catalysts have been used in a number of different hydrocarbon conversion treatments, and have been particularly valuable in treatments for the production of aromatics from naphthene-containing feed stocks in the naphtha boiling range. A great advantage of the use of these catalysts has been the high selectivity with which certain types of hydrocarbons, referred to collectively as "aromatic precursors" can be converted to aromatics with the minimum of side reactions.

It has recently been found that these noble metal catalysts can be employed to particular advantage on a catalyst support in which alumina is the major constituent, and the catalytic metal is present in very small amounts or even trace amounts. Thus, a variety of catalysts containing fractional percentages of platinum or palladium on an alumina-containing carrier have been found to be applicable to such processes. They may be used to convert naphtha fractions of low motor fuel value to premium quality products having a high aromatic content, and improved volatility. An important advantage of these catalysts is that the particular combination of reactions which they promote with a naphtha feed stock is such that the original low octane quality feed constituents may be almost completely removed by a combination of isomerization, dehydrogenation and cyclization reactions.

These catalysts have been particularly useful in reactions of the general type known as hydroforming. This is an operation carried out in the presence of a solid catalyst and in an atmosphere containing free hydrogen, but without a net consumption of hydrogen. In hydroforming operations, there is ordinarily a net evolution of hydrogen due to the transformation of other hydrocarbons into aromatics. The group of hydrocarbons or aromatic precursors thus transformed includes substantially all of the $C_6$ ring naphthenes, a varying proportion of the $C_5$ ring naphthenes, and a proportion of the original paraffins which varies both with operating conditions and with the content of $C_6+$ hydrocarbon chains in the paraffin molecules present.

Hydroforming reactions can be carried out at sufficiently high partial pressures that the formation of coke deposits is completely repressed. Such operations, at hydrogen partial pressures of the order of 500–1000 pounds per square inch, may result in a fairly complete conversion of the cyclohexanes in the original feed stock to the corresponding aromatics. In addition there is a certain amount of aromatics formed from other types of hydrocarbons. For a given catalyst, however, the use of high hydrogen pressures tends to increase the breakdown of the original molecular structure to lower molecular weight saturated materials by a combination of various cracking, dealkylation, and re-hydrogenation reactions known collectively as hydrocracking. Hydrocracking under these high hydroforming pressures can be minimized, but only to a limited extent, by suitable variations in the composition of the catalyst.

The use of relatively low hydroforming pressures in the general range from about 50 lbs. to 400 lbs./sq. in. results in a product of higher octane quality than that produced in the higher pressure hydroforming type of operation. A substantial added advantage is realized from the fact that this improved product quality is obtained with less total degradation of the feed stock, to light gases and coke, than in the high pressure non-regenerative type of operation.

The difference here is caused in some degree by an increase in the activity of the catalyst toward isomerization and aromatization of the paraffins and naphthenes other than cyclohexane derivatives. At the same time, while such a low hydrogen partial pressure does relieve the tendency toward hydrocracking, it permits certain undesirable side reactions to occur which lead to the formation of coke deposits on the catalyst. The amount of this coke formed is not large, so that the amount of hydrocracking which takes place under high pressure hydroforming conditions tends to be considerably more than the total amount of feed degradation to light gas and coke in the low pressure range of operation. For a given octane improvement, therefore, the over-all yield of hydroformed product in the naphtha boiling range is greater under the low pressure conditions.

In general, in any of these hydrocarbon conversion processes, more severe treating conditions can be used to give a product of higher octane quality at the expense of a loss in gasoline yield. This loss in yield ordinarily corresponds first to a degradation to light gaseous products. The degradation of feed to coke and to heavy by-products is often an even more serious consideration, since it may result in a rapid loss in catalyst activity due to contamination of the catalyst surface. The development of new catalysts has been particularly important to the extent that it has made possible the preparation of materials of high octane quality and desirable volatility without an increase in the degradation of feed to gas, coke, and heavy liquid by-products. At the same time, it is important to develop catalysts which give the highest quality product. For many uses, such as aviation gasoline, the production of premium quality is an absolute requirement.

A serious disadvantage of the supported noble metal catalysts, of which platinum on alumina may be taken as typical, is the fact that a coked catalyst cannot ordinarily be regenerated readily with air over long periods of time without a definite loss in activity. This activity loss is so severe in many cases that it becomes completely impossible to produce a product of more than mediocre quality. A careful study of the characteristics of highly active and spent catalysts of this general nature has indicated that the structure of the platinum has a definite relationship to activity. Apparently, the ability of these catalysts to stand repeated regeneration as required for low pressure hydroforming operations can be correlated to a considerable extent with the fineness and uniformity of the initial dispersion. Catalysts of low initial activity, or catalysts whose activity has become spent upon repeated regeneration, are found on X-ray crystallographic examination to have the platinum in the form of relatively large crystals. For a given platinum content, this means that there are fewer active platinum centers exposed, less platinum surface exposed for catalytic action, less intimate contact between the platinum and the catalyst support, and correspondingly more catalyst surface where the base is relatively remote from a platinum center of activity.

Without limiting the present invention to any theories of operation, it is apparent that the most highly active catalysts are those in which the platinum present on final reduction to the metallic form is finely dispersed throughout the carrier.

An object of the present invention is to prepare a noble metal catalyst for the hydroforming of naphthas which will produce a product of improved octane quality with no loss in yield.

Another object is to prepare a noble metal catalyst of improved regeneration characteristics.

Still another object is to prepare such a catalyst in which the noble metal is stabilized for repeated regenerations by being held in a matrix of gel carrier.

Another object is to prepare such a catalyst by a specific process in which the alumina-containing carrier is precipitated by an ammoniacal reagent in the presence of platinum, which is carried down thereby in the finest state of dispersion.

According to the present invention, catalysts of improved activity, selectivity and stability may be obtained by the precipitation of alumina from an aluminum salt solution, in the presence of a platinum salt or colloidal platinum dispersion. The initial dispersion obtained by including platinum into the gelatinous alumina precipitated in this mode of operation becomes held in active and finely dispersed form. This degree of dispersion is retained upon activation and development of the fine alumina structure by calcination of the initial gelatinous precipitate.

Catalysts prepared according to this invention may be made by slowly adding a dilute solution of ammonia to a vigorously agitated and dilute solution of a suitable aluminum salt such as aluminum chloride and the required small amount of chloroplatinic acid. In this method of preparation no precipitant for the platinum is employed, that is, ammonia alone in the absence of precipitating alumina does not cause the formation of a precipitate from chloroplatinic acid under these conditions. On the other hand, the ammonia may contain a sufficient quantity of ammonium sulfide or ammonium hydrogen sulfide to convert platinum to the form of a colloidal dispersion of platinum sulfide. The amount of ammonia added may be controlled in either case to obtain precipitates at varying hydrogen ion concentrations.

This method is particularly suited for the preparation of catalysts containing small amounts of platinum, of the order of from about 0.05 to 2% by weight of metallic platinum in the finished catalyst. While catalysts of the lowest platinum concentration have very desirable activity-selectivity relationships, catalyst activity is improved markedly with increasing platinum concentrations up to about 0.3% platinum. A continued improvement in activity with no loss in selectivity is observed up to about 2% Pt concentration, but the gain above 1% platinum is not as great. Accordingly, concentrations in the range of about 0.3 to 1% Pt in the finished catalyst are preferred.

After precipitation, the voluminous gelatinous precipitate of hydrous alumina containing occluded platinum or platinic sulfide is filtered to remove excess water, washed if desired, dried, and formed into desired shape for use in hydroforming reaction. This drying may be carried out in various ways. It may be either ground or pilled after drying, for example, and dried in successive stages at 250°, 500° and 900° F. to volatilize ammonium chloride or other ammonium salts present and activate the catalyst. The dried catalyst is subsequently reduced in H₂ before use.

Catalysts of the same general nature may also be prepared by adding a dilute aqueous solution of aluminum chloride and a small amount of chloroplatinic acid to a vigorously agitated solution of ammonia, or ammonium hydroxide containing ammonium sulfide or ammonium hydrogen sulfide. The sulfide concentration may be adjusted to permit complete or partial precipitation of platinum sulfide. Best results are found in either case when the precipitation of hydrous alumina occurs on the alkaline side. The catalyst is then filtered and dried as described above. Catalysts of the preferred composition may be prepared by adding either separate or combined solutions of aluminum chloride and chloroplatinic acid to the ammonia water.

Any of these procedures may be employed using a precipitating agent for platinum such as ammonium sulfide, ammonium hydrogen sulfide, or ammonium carbonate, or without such a separate ionic precipitating agent.

Another method of operation within the scope of this invention consists of carrying out the precipitation in the presence of the minimum amount of water, adding concentrated ammonium hydroxide with or without a precipitating agent to a concentrated solution of aluminum chloride and the required amount of chloroplatinic acid. In this instance, the final precipitate need not be filtered but can be concentrated by heating to remove excess water and ammonium chloride. The precipitate can be washed after partial dehydration, if desired, to remove a part of the soluble salts present after the platinum and gel have been fixed in the initial drying stages. The final composition, with or without such washing, is then activated by calcination.

This general method of operation can also be employed conveniently to incorporate certain additional stabilizing components such as silica, zirconia, chromia or titania. The alumina can be modified similarly by dissolving zinc oxide or a soluble salt of zinc, calcium or magnesium in the initial solution together with the aluminum and platinum salts, prior to the precipitation.

Any of these materials may be added in the form of their chlorides or oxychlorides, which may be particularly advantageous in view of the beneficial effect of small amounts of residual halogen in promoting the activity of platinum-on-alumina and related noble metal catalysts of this general type. It will be understood, of course, that the nitrates, sulfates or other soluble salts of these components may be preferred and that the use of any soluble salt comes within the purview of this invention.

In certain cases it may be beneficial to add wetting or dispersing agents during the precipitation to enhance the dispersion of the platinum or other active metal component and thus to improve stability of the resulting catalysts. Non-ionic agents may be employed in which case they will be removed by subsequent calcination, or ionic agents may be used and then removed by washing.

Several examples of catalysts containing the same nominal concentration of 0.5% Pt on alumina will now be given to illustrate this mode of catalyst preparation.

*Example 1*

A reforming catalyst is prepared by placing 7,260 g. of 28% ammonia water, 4 liters of distilled water and 20 cc. of ammonium hydrogen sulfide (made by saturating ammonium hydroxide solution with hydrogen sulfide) in a stainless steel vessel. A solution containing 5,300 g. of aluminum chloride hexahydrate and 13.5 g. of chloroplatinic acid in 9 liters of water is then added slowly, giving a pH of 8.5 after the addition is completed. The material is then concentrated by drying and dried for 16 hours at 250° F., after which the temperature is raised to 600° F. over an 8-hour period. Finally, the catalyst is calcined for 16 hours at 1000° F., pulverized, and formed into pellets.

This catalyst is charged to a reactor and used for hydroforming a 200–330° F. virgin naphtha which has a 45 Research octane number (clear). At 900° F., 200 p. s. i. g. operating pressure, 6/1 hydrogen to hydrocarbon mole ratio and 1 v./v./hr. space velocity a liquid product possessing a 98.7 Research clear octane number is obtained.

*Example II*

A second catalyst is prepared as in Example I, with the exception that the ammonia water containing sulfide ion is added to the concentrated aluminum chloride-chloroplatinic acid solution, and the final pH after addition is 1.5. When tested at 900° F., 200 p. s. i. g. operating pressure, 6/1 hydrogen to hydrocarbon mole ratio and 1 v./v./hr. space velocity with 200–330° F. virgin naphtha this catalyst produces a hydroformate of 88.2 Research octane number (clear).

*Example III*

In this example, an active catalyst of the same overall composition is prepared without the use of a sulfide precipitant. An aqueous solution containing 5300 grams of $AlCl_3 \cdot 6H_2O$ and 13.5 grams $H_2PtCl_6$ in 65 liters total volume is added to 65 liters of water containing 7260 g. of 28% ammonium hydroxide. The gelatinous precipitate formed, at a final pH of 9.0, leaves a colorless supernatant liquid essentially free of platinum, which has been carried down with the precipitated alumina. The filtered precipitate is dried at 250, 500, and 900° F. On testing under the standard hydroforming test conditions described above, the catalyst thus produced gives a product having a Research octane number of 88.6 in an initial 1.5 hour cycle at a 2 v./v./hr. space velocity, followed by a second period without intervening regeneration in which a 95.2 clear Research octane product is obtained at a feed rate of 1 v./v./hr.

*Example IV*

A preparation exactly similar to the catalyst of Example III, but where the ammonia solution is added to the solution of aluminum chloride and chloroplatinic acid, gives a pH during the initial stages of the precipitation of 3.5 and a final pH of 8.5. The catalyst prepared under these conditions, after filtering, drying and testing as before, gives an initial product octane of 2 v./v./hr. of only 80.5 Research clear.

These data show clearly the advantage of carrying out the precipitation in an alkaline medium. While the catalysts of Example II and Example IV are not entirely inactive, the product obtained under standard test conditions is very markedly lower in quality when the initial catalyst precipitation is carried out on the acid side.

It will be understood as above that while these examples have been described using aluminum chloride as the starting point, it is equally possible to carry out precipitations according to this procedure using other aluminum salts such as the sulfate or nitrate. The chloride is ordinarily to be preferred for the platinum salt, or for the other noble metal catalysts such as those of palladium, iridium or rhodium which can be similarly prepared. These noble metals are most readily available in the form of soluble halides, or their acid salts analogous to chloroplatinic acid.

It will also be understood that this mode of operation may be varied by changing the degree of dilution of the salts within wide limits, and that the solutions may be added simultaneously or in any preferred order, providing only that the platinum or noble metal salt solution be present before ammoniacal precipitation of the alumina is initiated.

What is claimed is:

1. The method of preparing a platinum-on-alumina catalyst for the treatment and conversion of hydrocarbons which comprises dissolving in an aqueous solution of an aluminum salt an amount of a platinum halide compound equivalent from about 0.05 to 2% by weight of metallic platinum in the finished catalyst, combining said solution with an ammoniacal solution to get an alkaline mixture, precipitating a hydrous alumina therefrom and carrying platinum down therewith as a dispersion uniformly distributed throughout said precipitated alumina, separating said precipitate from the aqueous phase, drying, calcining and reducing said platinum dispersion to metallic platinum to recover an active hydroforming catalyst.

2. The method according to claim 1 in which said ammoniacal solution contains ammonium hydrogen sulfide, said sulfide being present in an amount to form platinum sulfide and said platinum dispersion is a colloidal platinum sulfide.

3. The method of preparing a platinum-on-alumina catalyst for the hydroforming of napththas which comprises dissolving together in dilute aqueous solution an aluminum salt and an amount of choloroplatinic acid equivalent to from about 0.3 to 1.0% by weight of metallic platinum in the finished catalyst, combining said solution with an ammoniacal solution containing ammonium hydrogen sulfide to get an alkaline mixture, said sulfide being present in an amount to form platinum sulfide precipitating a hydrous alumina therefrom containing a uniformly distributed dispersion of colloidal platinum sulfide, separating said material from the aqueous phase, washing, drying, calcining and reducing said platinum sulfide to metallic platinum to recover an active hydroforming catalyst.

4. The method of preparing a platinum-on-alumina catalyst for the hydroforming of naphthas which comprises dissolving together in concentrated aqueous solution aluminum chloride and an amount of chloroplatinic acid equivalent to from about 0.3 to 1.0% by weight of metallic platinum in the finished catalyst, combining said solution with an ammoniacal solution to get an alkaline mixture, forming therefrom a slurry of hydrous alumina containing a platinum compound dispersed therethrough, drying said slurry directly to remove free moisture therefrom and partially dehydrating said hydrous alumina, washing said partly dried material, further drying, calcining and reducing said platinum compound to metallic platinum to recover an active hydroforming catalyst.

5. The method of preparing a platinum-on-alumina catalyst for the treatment and conversion of hydrocarbons which comprises dissolving in an aqueous solution of an aluminum salt an amount of chloroplatinic acid equivalent from about 0.05 to 2% by weight of metallic platinum in the finished catalyst, combining said solution to an initial pH above about 8.5 with an ammoniacal solution containing an ionic precipitating agent for platinum, precipitating therefrom a hydrous alumina and carrying an insoluble platinum compound down therewith as a dispersion uniformly distributed throughout said precipitated alumina, separating said precipitated mixture from the aqueous phase, drying, calcining and reducing said platinum dispersion to metallic platinum to recover an active hydroforming catalyst.

6. The method according to claim 5 in which said precipitated mixture is washed, dried, calcined and reduced with hydrogen to convert said platinum dispersion to a highly active catalytic form of metallic platinum.

7. The method of preparing a platinum-on-alumina catalyst for the hydroforming of naphthas which comprises precipitating a hydrous alumina from an aqueous solution of an aluminum salt containing an amount of chloroplatinic acid equivalent to from about 0.3 to 1.0% by weight of metallic platinum in the finished catalyst, by the addition thereto of an ammoniacal solution to give an alkaline mixture having an initial pH of at least about 8.5, forming thereby a precipitate of hydrous alumina containing a platinum compound finely dispersed therethrough, separating the remaining unimbibed water therefrom, washing, drying, calcining and reducing said platinum dispersion with hydrogen to recover an active hydroforming catalyst.

8. The method of preparing a platinum-on-alumina catalyst for the treatment and conversion of hydrocarbons which comprises dissolving in an aqueous solution of an aluminum salt an amount of a water-soluble platinum compound providing the equivalent of about 0.05 to 2% by weight of metallic platinum in the finished catalyst, combining said solution with an ammoniacal solution to get an alkaline mixture, precipitating a hydrous alumina therefrom and carrying platinum down therewith as a dispersion uniformly distributed throughout said precipitated alumina, separating said precipitate from the aqueous phase, drying, calcining and reducing said platinum dispersion to metallic platinum to recover an active hydroforming catalyst.

9. The method defined by claim 8 in which the said platinum compound is a platinum halide.

10. In the preparation of a platinum-on-alumina catalyst, the improvement which comprises preparing in combination an aqueous solution of an aluminum salt and a platinum salt, said solution providing the equivalent of about 0.05 to 2% by weight of metallic platinum in the finished catalyst, and thereafter precipitating a hydrous alumina therefrom and carrying platinum down therewith by incorporating ammonium ions in said solution, obtaining an alkaline solution having an initial pH of at least about 8.5.

References Cited in the file of this patent

UNITED STATES PATENTS

| | | |
|---|---|---|
| 2,479,110 | Haensel | Aug. 16, 1949 |
| 2,606,878 | Haensel | Aug. 12, 1952 |
| 2,611,736 | Haensel | Sept. 23, 1952 |